United States Patent [19]
Okamoto et al.

[11] Patent Number: 5,981,647
[45] Date of Patent: Nov. 9, 1999

[54] RESIN COMPOSITION FOR A WHITE MARKING

[75] Inventors: Yoshio Okamoto, Toyo; Moriyuki Yokoyama, Ako-gun; Hiroshi Sagane, Sakai, all of Japan

[73] Assignee: Daicel Chemical Industries, Ltd., Osaka, Japan

[21] Appl. No.: 08/917,354

[22] Filed: Aug. 26, 1997

[30] Foreign Application Priority Data

Sep. 10, 1996 [JP] Japan .................................... 8-238780
Apr. 14, 1997 [JP] Japan .................................... 9-095645

[51] Int. Cl.⁶ .............................. C08J 33/10; C08K 3/04
[52] U.S. Cl. ........................................... 524/504; 524/496
[58] Field of Search ..................... 524/504, 496

[56] References Cited

U.S. PATENT DOCUMENTS 5,760,120  6/1998  Itoh et al. ................. 524/431

FOREIGN PATENT DOCUMENTS 56-45926   4/1981   Japan .
63-081117  4/1988   Japan .
247314B2  10/1990   Japan .
4267191    9/1992   Japan .
5025317    2/1993   Japan .
8025806    1/1996   Japan .

*Primary Examiner*—Melvyn I. Marquis
*Assistant Examiner*—D. Aylward
*Attorney, Agent, or Firm*—Birch, Stewart, Kolasch & Birch, LLP

[57] ABSTRACT

A resin composition for a white marking, on which a white marking can be clearly developed by irradiation of laser beams, comprises an acrylic resin A, a styrenic resin B, and a black dye/pigment C. Use can be made of poly(methyl methacrylate) as the resin A, a rubber-modified styrenic resin such as an ABS resin as the resin B, and a carbon black as the black dye/pigment C. The proportion of the resin A to the resin B (the former/the latter, by weight) is about 1/99 to 99/1. The proportion of the black dye/pigment C is about 0.01 to 3 parts by weight relative to 100 parts by weight of the total amount of the resin A and the resin B. The resin composition may further comprise a white dye/pigment D such as titanium oxide in 0.01 to 10 parts by weight, relative to 100 parts by weight of the total amount of the resins A and B.

17 Claims, No Drawings

RESIN COMPOSITION FOR A WHITE MARKING

FIELD OF THE INVENTION

The present invention relates to a resin composition for a white marking which can form a white marking by irradiating laser beams, particularly, a resin composition which has not only excellent white-marking properties, but also a remarkable moulding processability and impact resistance, and is available at an inexpensive price as well as recyclable. To be more specific, the present invention relates to a resin composition for the white marking which is useful for a production of a moulded article whose surface can be marked with recognisable or legible white letters or figures (e.g. key caps of a keyboard, button parts of a motorcar) by irradiating laser beams with a wavelength of, for instance, 1064 nm thereon.

BACKGROUND OF THE INVENTION

It is a common practice to print letters, designs, figures and the like on the surface of a moulded resin article. The printing is performed by a variety of known techniques, from those using paints such as pad printing and impregnation printing, to a printing technique by means of laser beam irradiation (hereinafter, mentioned as laser marking). Although the methods using a paint are most widely employed for such printing, the processes have disadvantages: high processing cost, fears of environmental pollution by solvents, less possibility of recycling, etc. On the other hand, laser marking is a cheaper and more efficient method than the painting techniques owing to its simple marking process. Laser marking ensures excellent durability of the printed materials, thus being highly valuable in industrial applications. As a result, many techniques have been suggested for laser marking. For instance, Japanese Patent Application Laid-open No. 45926/1981 (JP-A-56-45926) teaches a technology for marking the surface of a moulded resin article made of a resin blended with a filler discolourisable by laser beam irradiation.

An example of the moulded articles to be printed with letters and figures by laser marking includes a keyboard of a personal computer. Main printing methods for the surface of a keyboard used to be pad printing onto an acrylonitrile-butadiene-styrene copolymer (an ABS resin) and impregnation printing onto polybutylene terephthalate (a PBT resin). However, in consideration of environmental problems inclusive of recycling as well as the factor of the cost, the marking method comprising irradiation of laser beams by using an Nd:YAG laser or other lasers on an ABS resin has been replacing the above processes.

On the one hand, a black or dark-coloured marking is generally effective on a moulded article coloured in light gray, cream or other colours having a high brightness or lightness. On the other hand, the black-marking does not stand out on a black or dark-coloured article. In the case of the latter, letters and figures should be printed in white or a whitish colour (hereinafter, referred to as a white marking). However, it is usually impossible to develop a white marking on an ABS resin by irradiation of laser beams.

Japanese Patent Publication No. 47314/1990 (JP-B-2-47314) discloses a marking technique for resins. The technique comprises irradiating laser beams on the surface of a thermoplastic resin such as an acrylic resin, whereby the irradiated part foams and lifts up to form a white-marked section. As methods of making a white marking on the surface of resins, there are other known methods which comprise incorporating, into a resin, titanium black [Japanese Patent Application Laid-open No. 81117/1988 (JP-A-63-81117), and Japanese Patent Application Laid-open No. 25806/1996 (JP-A-8-25806)], cordierite and/or mica [Japanese Patent Application Laid-open No. 267191/1992 (JP-A-4-267191)], aluminium hydroxide [Japanese Patent Application Laid-open No. 25317/1993 (JP-A-5-25317)], and other inorganic compounds. These methods are still impractical in terms of the whiteness and quality of the marked letters and figures, and also in terms of the impact resistance, which has decreased as a result of the incorporation of the inorganic compounds.

SUMMARY OF THE INVENTION

It is therefore an object of the present invention to provide a resin composition for a white marking which can develop a clear white marking by irradiating laser beams.

It is another object of the present invention to provide a resin composition for a white marking which can give a remarkable white marking without losing the impact resistance of the moulded article.

It is a further object of the present invention to provide a resin composition for a white marking on which a marking can be made with a high whiteness even when the irradiation energy intensity of laser beams is low.

A still further object of the present invention is to provide a resin composition for a white marking which has a good moulding processability.

The inventors of the present invention have worked hard on the subject in order to achieve the above objects, and finally discovered that a moulded article which is made of a resin composition comprising specific resins in combination with a specific dye or pigment can develop a remarkably distinct white marking in response to irradiation of laser beams. The present invention is based o n the above findings.

In other words, the present invention provides a resin composition for a white marking which comprises an acrylic resin A, a styrenic resin B, and a black dye or pigment C, and which can be marked in white by irradiation of laser beams.

The proportion of the acrylic resin A relative to the styrenic resin B (the former/the latter) is about 1/99 to 99/1 (by weight). The proportion of the black dye or pigment C is about 0.01 to 3 parts by weight relative to 100 parts by weight of the total amount of the resin A and the resin B. Of the monomers constituting the resin A and the resin B, an acrylic monomer may amount to about 20 to 80% by weight as a whole.

The resin composition may further comprise a white dye or pigment D such as titanium oxide. The ratio of the white dye or pigment D is about 0.01 to 10 parts by weight relative to 100 parts by weight of the total amount of the resins A and B.

As the resin A, use can be made of poly(methyl methacrylate). The number average molecular weight of the resin A is, for example, around 50,000 to 150,000. Used as the resin B is a rubber-modified styrenic resin such as an acrylonitrile-butadiene-styrene copolymer, and a mixture of an acrylonitrile-butadiene-styrene copolymer and an acrylonitrile-styrene copolymer, to name a few. When an acrylonitrile-butadiene-styrene copolymer or a mixture of an acrylonitrile-styrene copolymer and an acrylonitrile-styrene copolymer is used as the resin B, the proportion of an acrylonitrile monomer unit relative to an styrene monomer unit is about 15/85 to 28/72 (the former/the latter, by weight). The number average molecular weight of (a) a polymer constituting the resin B or (b) a matrix component is, for example, about 30,000 to 100,000, determined for (a) the polymer, provided that the polymer is a homogeneous resin, or (b) the matrix component, provided that the polymer constituting the resin B is a heterogeneous resin composed of a continuous phase of the matrix component and a disperse phase. A carbon black having an average particle size of about 10 to 90 nm can be used as the black dye/pigment C.

Throughout the present specification, acrylic resins and methacrylic resins are generalised by the term "acrylic resin." It should also be understood that acrylic acid and methacrylic acid may be generically called "(meth)acrylic acid," and that acrylic acid esters and methacrylic acid esters may be called "(meth)acrylic acid ester."

DETAILED DESCRIPTION OF THE INVENTION

Acrylic Resin A

The acrylic resin A includes a homo- or copolymer which contains, as the constitutive monomer, at least one monomer selected from acrylic monomers including (meth)acrylic acids and (meth)acrylic acid esters. The role of the acrylic resin A is to foam up in response to irradiation of laser beams (e.g. wavelength 1064 nm) and develop a white marking on the surface of a moulded article.

As the (meth)acrylic acid esters, there may be mentioned methyl acrylate, ethyl acrylate, propyl acrylate, butyl acrylate, hexyl acrylate, 2-ethylhexyl acrylate, and corresponding methacrylic acid esters and other alkyl(meth)acrylates [e.g. $C_{1-10}$ alkyl(meth)acrylates], preferably $C_{1-6}$ alkyl(meth)acrylates [in particular, $C_{1-4}$ alkyl (meth)acrylates such as methyl methacrylate and butyl acrylate]. Among them, methyl methacrylate is most desirable.

The copolymer may comprise a monomer other than the acrylic monomer as the constitutive monomer. Such a monomer needs only to be copolymerizable with the acrylic monomer, and includes, for instance, vinyl ester monomers such as vinyl acetate, styrenic monomers to be named below, vinyl cyanide-series monomers, maleic anhydride and imide-series monomers.

The acrylic resin A may contain a rubber component. The rubber component includes, for instance, polybutadiene, a butadiene-styrene copolymer, polyisoprene, a butadiene-acrylonitrile copolymer, an isobutylene-isoprene copolymer, an ethylene-propylene rubber, an acrylic rubber, a urethane rubber, a silicon rubber and the like. The rubber component can be incorporated into the acrylic resin A by blending, or by copolymerization such as graft copolymerization and block copolymerization.

Examples of the desirable acrylic resin A include poly(methyl methacrylate); and polymers containing methyl methacrylate as the constitutive monomer, such as a methyl methacrylate-styrene copolymer and a methyl methacrylate-butadiene-styrene copolymer. From the standpoints of a balance of white-marking properties, mechanical strength, expenses, and compatibility with the styrenic resin B, it is especially favourable to select poly(methyl methacrylate). These acrylic resins A can be used alone or in combination.

The number average molecular weight of the acrylic resin is, for instance, about 50,000 to 150,000, and preferably about 60,000 to 120,000. Where the number average molecular weight is less than 50,000, the impact resistance is apt to decrease. In addition, the resin composition is likely to suffer from a decrease in strength and inferior external appearances such as flow marks, due to its insufficient compatibility with the styrenic resin. On the other hand, an acrylic resin with a number average molecular weight of more than 150,000 gives the resin composition an excessively high melt viscosity, thereby sacrificing the mouldability.

Styrenic Resin B

The styrenic resin B only needs to contain at least one monomer selected from styrenic monomers as the constitutive monomer, and may be either of a homopolymer or a copolymer. The styrenic resin B, which cannot show white-marking properties by itself, imparts remarkable marking-accelerating effect when used in combination with the acrylic resin A. The styrenic resin B enables the acrylic resin A to show its white-marking properties by irradiation of laser beams at a lower intensity, in comparison with the single use of the acrylic resin A. Further, the styrenic resin B is highly compatible with the acrylic resin A, and imparts a high impact resistance and excellent mouldability to the resin composition.

The styrenic resin includes styrene, an alkyl-substituted styrene (e.g. o-methylstyrene, m-methylstyrene, p-methylstyrene), a halogen-substituted styrene (e.g. o-chlorostyrene, p-chlorostyrene, o-bromostyrene), an α-alkyl-substituted styrene having an alkyl substituent in an α position (e.g. α-methylstyrene, α-ethylstyrene) and the like. Styrene and α-methylstyrene are particularly preferred among these.

The styrenic resin B may contain a monomer other than the styrenic monomer as the constitutive monomer. Such monomers include monomers copolymerizable with the styrenic monomer, such as vinyl cyanide monomers, maleic anhydride, imide-series monomers and the aforesaid acrylic monomers. The vinyl cyanide-series monomers include acrylonitrile and methacrylonitrile. The imide-series monomers include an N-alkylmaleimide (e.g. N-methylmaleimide, N-ethylmaleimide), an N-cycloalkylmaleimide (e.g. N-cyclohexylmaleimide), an N-arylmaleimide [e.g. N-phenylmaleimide, N-(2-methylphenyl)maleimide] and so on.

Additionally, the styrenic resin B may contain a rubber component. Use of a rubber-modified styrenic resin dramatically improves the impact resistance of a moulded article. The rubber-modified styrenic resin includes a rubber-reinforced styrenic resin in which a rubber component is incorporated into the styrenic resin by blending, a graft or block copolymer in which a rubber component is introduced into the styrenic resin by copolymerization, and so on. The rubber components exemplified in the section of the acrylic resin A can be utilised. In the rubber-modified styrenic resin, the content of the rubber component is, for example, about 5 to 70% by weight, preferably about 10 to 50% by weight, and more preferably about 20 to 40% by weight.

Preferable styrenic resins B include polystyrene; poly(α-methylstyrene); rubber-modified styrenic resins such as a styrene-butadiene copolymer, a styrene-acrylonitrile-butadiene copolymer (an ABS resin), an α-methylstyrene-modified ABS resin and an imide-modified ABS resin; and a styrene-acrylonitrile copolymer (SAN). In order to hold a balance between the whiteness of the marking and the impact resistance of the moulded article, it is desirable to use a polymer containing styrene as a constitutive monomer, in particular, a rubber-modified styrenic resin (e.g. ABS resin, modified ABS resin) comprising styrene, as the constitutive monomer, and a rubber component.

It is especially preferred to use, as the styrenic resin B, an acrylonitrile-butadiene-styrene copolymer, or a mixture of an acrylonitrile-butadiene-styrene copolymer and an acrylonitrile-styrene copolymer. In such a styrenic resin B, the ratio of the acrylonitrile monomer unit relative to the styrene monomer unit (the former/the latter, by weight) is, for instance, in the range of about 15/85 to 28/72, and preferably about 17/83 to 26/74. The ratio of the former/the latter (by weight) in the styrenic resin B may practically be in the range of about 15/85 to 25/75 (for example, about 18/82 to 24/76). For applications as a heat-resistant article, a heat-resistant ABS resin can be employed with advantage, including an α-methyl-styrene-modified ABS resin and an imide-modified ABS resin. The styrenic resin B can be used independently or as a mixture of two or more.

In this styrenic resin B, the number average molecular weight of (a) a polymer constituting the resin B or (b) a matrix component is, for instance, about 30,000 to 100,000, being determined for (a) the polymer, provided that the polymer is a homogeneous resin, or (b) the matrix component, provided that the polymer constituting the resin B is a heterogeneous resin composed of a continuous phase of the matrix component and a disperse phase. The number average molecular weight is preferably about 30,000 to 80,000, and more preferably about 31,000 to 50,000.

By way of example, (i) an acrylonitrile-butadiene-styrene copolymer, or (ii) a mixture of an acrylonitrile-butadiene-styrene copolymer and an acrylonitrile-styrene copolymer is used as the styrenic resin B. When (a) the acrylonitrile-butadiene-styrene copolymer is a homogeneous resin, it is desirable that the number average molecular weight of the acrylonitrile-butadiene-styrene copolymer [in the case of (ii), the number average molecular weight of either the acrylonitrile-butadiene-styrene copolymer or the acrylonitrile-styrene copolymer (preferably, both the acrylonitrile-butadiene-styrene copolymer and the acrylonitrile-styrene copolymer)] stays in the above range. When (b) the acrylonitrile-butadiene-styrene copolymer is a heterogeneous system (a two-phase system) resin in which the rubber component (polybutadiene) is dispersed in the matrix component (an acrylonitrile-styrene copolymer), it is desirable that the number average molecular weight of the matrix component [in the case of (ii), the number average molecular weight of either the matrix component or the acrylonitrile-styrene copolymer (preferably, both the matrix component and the acrylonitrile-styrene copolymer)] lies in the above range.

If the number average molecular weight is below 30,000, the impact resistance of the resin composition tends to be deteriorated. And if the number average molecular weight exceeds 100,000, the resultant resin composition has not only an excessively high melt viscosity just to sacrifice mouldability, but also an insufficient compatibility with the acrylic resin A only to result in the drop of the strength or external deficiency such as flow marks.

By keeping the difference between the number average molecular weights of the resin A and the resin B, the compatibility between the resins A and B improves drastically. As a consequence, the strength of the resin composition is enhanced and the external deficiency such as flow marks is inhibited. The difference between the number average molecular weight of the resin A [Mn(A)] and that of the resin B [Mn(B)], ΔMn [=|Mn(A)−Mn(B)|], is, for example, not higher than 80,000, preferably not higher than 70,000, and more preferably not higher than 68,000 (in particular, 65,000 or less).

The ratio of the acrylic resin A to the styrenic resin B, A/B (by weight), is about 1/99 to 99/1, preferably about 10/90 to 90/10, and more preferably about 20/80 to 80/20 (e.g. 30/70 to 70/30). The ratio of A/B may practically be in the range of about 40/60 to 60/40.

In terms of a balance among the whiteness of the marking, mechanical strength properties (particularly, the impact resistance) and mouldability, it is desirable that the acrylic monomer, in particular, (meth)acrylic acid and (meth)acrylic acid ester, amounts to, as a whole, about 20 to 80% by weight of the monomers constituting the acrylic resin A and the styrenic resin B. The ratio is preferably about 30 to 70%.

Black Dye/Pigment C

An organic or inorganic dye or pigment in black or dark colours can be employed as the black dye/pigment C. The black dye/pigment C absorbs laser beams (e.g. wavelength 1064 nm) and converts them into thermal energy, the energy making the resin foam or craze to develop white markings.

Examples of the black dye/pigment C include a carbon black (e.g. acetylene black, lamp black, thermal black, furnace black, channel black), titanium black, and black iron oxide. A carbon black is strongly recommended for dispersibility, colour development and the cost. The black dye/pigment C is used singly or in combination.

The average particle size of the black dye/pigment C can be selected from a wide range of about 10 nm to 3 μm (preferably, 10 nm to 1 μm). To give an example, a carbon black, used as the black dye/pigment C, has a mean particle size of about 10 to 90 nm, preferably about 14 to 90 nm (e.g. 16 to 80 nm), and more preferably about 17 to 50 nm (e.g. 17 to 40 nm), irrespective of its production process. A black dye/pigment with too small a particle size consumes much energy for the marking, while a black dye/pigment with too large a particle size is likely to end in deterioration of physical properties such as mechanical strength.

The amount of the black dye/pigment C is, for example, about 0.01 to 3 parts by weight, preferably about 0.02 to 2 parts by weight, and more preferably about 0.05 to 1 part by weight, relative to 100 parts by weight of the total amount of the polymer A and the polymer B. When the amount of the black dye/pigment C is too little, a marking tends to be thin (faint) as a result of decreased conversion efficiency of laser beams into heat. However, when too much added, marked letters and figures may turn dark due to its excessive absorption of heat.

White Dye/Pigment D

The white dye/pigment D is not specifically restricted and may be organic or inorganic, as far as being a whitish dye or pigment. This white dye/pigment D is considered to scatter laser beams (e.g. wavelength 1064 nm), thereby helping the dye/pigment C to enhance the absorption efficiency of laser beams and the conversion efficiency to heat to a great extent. Therefore, the combination of the black dye/pigment C and the white dye/pigment D provides a white marking with an admiring degree of whiteness. In addition, the intensity of laser beam irradiation energy can be reduced.

As the white dye/pigment D, there may be mentioned calcium carbonate, titanium oxide (titanium white), zinc oxide, zinc sulfide, lithopone and so on. Above all, titanium oxide is desirable, because it has an excellent hiding power and dispersibility, and enables a clear and distinctive white marking. The white dye/pigment D can be used independently or in combination.

The average particle size of the white dye/pigment D is about 0.01 to 3 μm, and preferably about 0.01 to 1 μm. Relative to 100 parts by weight of the total amount of the acrylic resin A and the styrenic resin B, the amount of the white dye/pigment D is about 0.01 to 10 parts by weight, preferably about 0.05 to 5 parts by weight, and more preferably about 0.1 to 3 parts by weight (particularly, about 0.1 to 1 part by weight). If too little is added, the white dye/pigment D cannot demonstrate a sufficient scattering effect of laser beams; whereas physical properties of the resin composition may be degraded if too much is added too much.

The total amount of the black dye/pigment C and the white dye/pigment D is, for instance, about 0.05 to 10 parts by weight, preferably about 0.1 to 5 parts by weight (e.g. 0.15 to 2 parts by weight), and more preferably about 0.2 to 1.5 part by weight (in particular, 0.3 to 1.2 part by weight) relative to 100 parts by weight of the total amount of the resin A and the resin B. The amount may practically be about 0.4 to 1.0 part by weight. By keeping the total amount of the dyes/pigments C and D in the above range, the whiteness of the marking and the mechanical strength of the resulting composition are well balanced, whereby a clear white marking can be obtained with maintaining the mechanical strength at a high level. The ratio of the white dye/pigment D to the black dye/pigment C, D/C (by weight), is, for instance, about 0.05 to 50, preferably about 0.1 to 5, and more preferably about 0.2 to 10.

The resin composition of the present invention may further comprise other resin components in addition to the acrylic resin A and the styrenic resin B [e.g. polyamide, polyester, polyphenylene sulfide, polyphenylene oxide, polyacetal, polyimide, poly(ether ether ketone), polycarbonate, epoxy resin, polyurethane, unsaturated polyester], compatibilising agents, additional dyes/pigments except the dyes/pigments C and D, flame-retarders, fillers (e.g. glass fibre, carbon fibre, metal filler), stabilisers (e.g. antioxidants, ultraviolet absorbers), slipping agents, dispersing agents, foaming agents, antimicrobial agents, and others. By way of illustration, the resin composition can be coloured in a desirable colour by adding a dye/pigment other than the dyes/pigments C and D thereto. The resin composition can be high-functionalised (e.g. flame-retardant, glass-reinforced) by adding a flame-retardant or a filler.

The resin composition can be prepared by mixing the above components in a conventional mixing method (e.g. melt-kneading) using, for example, an extruder, a kneader, a mixer, or a roll.

The resin composition of the present invention can be moulded into various articles according to a conventional moulding process such as extrusion moulding, injection moulding and compression moulding. Irradiation of laser beams on this moulded article gives a white marking on its surface. Laser beams can be irradiated with the use of a conventional laser such as YAG laser (e.g. wavelength 1064 nm), $CO_2$ laser, Ar laser, and Excimer laser. Among them, a YAG laser may practically be employed.

The resin composition of the present invention, which is composed of specific resins and a specific dye/pigment, is superior in white marking properties, impact resistance and moulding processability. Letters and the like can be easily marked by using laser beams instead of paints, which makes the resin composition recyclable and obtainable at a lower cost. The resin composition can be used with advantage for a wide range of moulded articles whose surface is marked with letters and figures, such as OA devices including keyboards of a computer or word processor, motorcar parts (e.g. button parts), household appliances, building materials, and so on.

A clear white marking can be obtained by irradiating laser beams on the resin composition for a white marking of the present invention. Further, the resin composition can be clearly white-marked without losing the impact resistance of the moulded article, and has an excellent moulding processability.

In addition, the resin composition containing the white dye/pigment ensures a marking with an appreciable whiteness, even if laser beams are irradiated at a low energy intensity.

The following examples are intended to describe the present invention in further detail and should by no means be interpreted as defining the scope of the invention.

EXAMPLES

Conditions and Evaluation Procedure of the Laser Marking

The components indicated in the following Examples and Comparative Examples were blended and moulded into a pellet by extrusion moulding. A 3-mm-thick plate was made of the pellet by injection moulding. White marking properties of the plate were tested by irradiating laser beams on its surface. Used as the laser was an Nd:YAG laser which gives out laser beams with a wave-length of 1064 nm.

As to the irradiation conditions, the light source current (LC), the QS frequency (QS), and the speed (SP) were changed within the ranges as shown below, with fixing the aperture at 2 mm. The whiteness was evaluated under the condition where the best white marking was obtained.

Light source current (LC): 10 to 20 A

QS frequency (QS): 1 to 30 kHz

Speed (SP): 100 to 1,500 mm/sec.

The whiteness of the marking (the degree of whitening) was visually judged by the following criteria.

| Whiteness Marked | Grade |
| --- | --- |
| Clear white | 4 |
| White | 3 |
| Almost white | 2 |
| White with much darkness | 1 |
| Not white | 0 |

Evaluation Procedure for Impact Strength

In accordance with the above method, the components were blended and pelletised. A test piece with a thickness of 6.4 mm was produced by injection moulding, for which an Izod impact value was measured. The evaluation was based on the following criteria.

| Izod Impact Value (J/m) | Grade |
| --- | --- |
| <50 | 1 |
| 50~100 | 2 |
| 100~150 | 3 |
| 150~200 | 4 |
| >200 | 5 |

Comprehensive Evaluation

The comprehensive evaluation was calculated as below.

Comprehensive Evaluation =

(grade for whiteness of the marking) × (grade for Izod impact value)

Components used in Examples and Comparative Examples

PMMA

Poly(methyl methacrylate), commercially available Number average molecular weight: 95,000 (measured by GPC).

ABS Resin

Prepared by a known emulsion polymerization method;

Polybutadiene (rubber component: disperse phase) content: 30% by weight

Acrylonitrile/styrene ratio in the matrix (continuous phase): 25/75 (by weight)

Number average molecular weight of the matrix: 32,000

SAN Resin

Prepared by a known bulk polymerization method;
Acrylonitrile/styrene ratio: 23/77 (by weight)
Number average molecular weight: 38,000

Carbon Black

Commercially available product (selected from the following, according to the average particle size)

CB-1: 20 nm
CB-2: 68 nm
CB-3: 14 nm

Titanium Oxide

As a white pigment, commercially available product.

Examples 1 to 6, and Comparative Examples 1 to 3

Resin compositions composed of the components shown in Table 1 were prepared and evaluated by the above-mentioned method. The results were compiled in Table 1.

TABLE 1

|  | Examples |  |  |  |  |  | Comp. Exs. |  |  |
| --- | --- | --- | --- | --- | --- | --- | --- | --- | --- |
|  | 1 | 2 | 3 | 4 | 5 | 6 | 1 | 2 | 3 |
| PMMA | 50 | 50 | 50 | 50 | 30 | 70 | 50 |  | 100 |
| ABS | 50 | 50 | 50 | 30 | 30 | 30 | 50 | 100 |  |
| SAN |  |  |  | 20 | 40 |  |  |  |  |
| CB-1 | 0.5 |  | 0.5 | 0.5 | 0.5 |  | 0.5 | 0.5 |  |
| CB-2 |  | 0.5 |  |  |  |  |  |  |  |
| CB-3 |  |  | 0.5 |  |  |  |  |  |  |
| Titanium oxide | 0.2 | 0.2 | 0.2 | 0.2 | 0.2 | 0.2 |  | 0.2 | 0.2 |
| Whiteness | 4 | 4 | 3 | 3 | 3 | 4 | 0 | 0 | 4 |
| Izod impact value | 4 | 3 | 4 | 2 | 2 | 2 | 4 | 5 | 1 |
| Comprehensive Evaluation | 16 | 12 | 12 | 6 | 6 | 8 | 0 | 0 | 4 |

The resin composition of Example 1 comprised 50 parts by weight of PMMA, 50 parts by weight of the ABS resin, 0.5 part by weight of the carbon black with a particle size of 20 nm, and 0.2 part by weight of titanium oxide. Under the conditions of LC=13.5 A, SP=400 mm/sec., and QS=8 kHz, the resin composition demonstrated a very clear white marking.

Example 2 was conducted in the same manner as in Example 1 except for using a 68 nm carbon black. The impact resistance was slightly declined, but the marking was as white as that of Example 1.

Example 3 was conducted by repeating the process of Example 1 with using a carbon black with a particle size of 14 nm. The whiteness of the marking, being somewhat deteriorated, was good enough for practical use.

The resin composition of Example 4 was prepared by repeating Example 1 with replacing a part of the ABS resin with the SAN resin (the rubber component content in the whole resin dropped by 40%). This resin composition can be put to a practical use, although the grades in the Izod impact value and the whiteness of the marking fell by small degrees.

The resin composition of Example 5 contained a reduced amount of PMMA compared to that of Example 4. This resin composition showed the same whiteness of the marking as that of Example 4.

Example 6 was different from Example 1 only in that the ratio of PMMA/ABS was changed to 70/30. The Izod impact value was a little inferior to that of Example 1, however, the whiteness of the marking was prominent.

The resin composition of Comparative Example 1 comprised 50 parts by weight of PMMA and 50 parts by weight of the ABS resin. No marking appeared on the resin composition after laser beam irradiation.

The resin composition of Comparative Example 2 comprised the ABS resin in combination with the pigments of Example 1. Although the resin developed a marking, the resin burnt brown or black, and it was impossible to obtain a white marking under any laser irradiation conditions.

The resin composition of Comparative Example 3 was obtained using PMMA and the pigments of Example 1. On this resin composition, a marking was obtained with a high degree of whiteness. However, its impact resistance was too low to be used for applications as key caps of a keyboard or the like.

Examples 7 to 10, and Comparative Example 4

Resin compositions composed of the components shown in Table 2 were prepared and evaluated based on the above criteria. The results were set forth in Table 2.

TABLE 2

|  | Examples |  |  |  | Comp. |
| --- | --- | --- | --- | --- | --- |
|  | 7 | 8 | 9 | 10 | Ex.4 |
| PMMA | 50 | 50 | 50 | 50 | 50 |
| ABS | 50 | 50 | 50 | 50 | 50 |
| CB-1 | 0.1 | 0.1 | 0.3 | 0.5 |  |
| Titanium Oxide |  | 0.5 | 1.5 | 2.5 | 0.2 |
| Whiteness | 2 | 4 | 3 | 2 | 0 |
| Izod impact value | 4 | 4 | 3 | 3 | 4 |
| Comprehensive Evaluation | 8 | 16 | 9 | 6 | 0 |

In Example 7, 0.1 part by weight of a carbon black was added to the polymers as used in Example 1 to give a resin composition. A good white marking was obtained under the conditions of LC=14.0 A, SP=400 mm/sec., and QS=8 kHz.

The resin composition of Example 8, which was prepared by adding 0.5 part by weight of titanium oxide to the components of Example 7, exhibited better white-marking properties than the resin composition of Example 7.

The resin compositions of Examples 9 and 10 contained the dyes/pigments (carbon black and titanium oxide) in a concentration three times (Example 9) or five times (Example 10) as high as that of the dyes/pigments used in Example 8. The whiteness of the marking showed a gradual decline with an increasing dye/pigment concentration. However, these resin compositions have a high impact strength, thus being suitable for some applications.

The resin composition of Comparative Example 4 was obtained by excluding the carbon black from the resin composition of Example 1. Although a marking appeared on the surface, no white marking was achieved. Foaming did not occur at a low LC, whereas the resin burned at a high LC.

What is claimed is:

1. A resin composition for a white marking which comprises an acrylic resin A, a styrenic resin B and a black dye or pigment C having a mean particle size of 10 to 90 nm, and which is capable of developing a white marking by irradiation of laser beams.

2. A resin composition for a white marking as claimed in claim 1, wherein the proportion of the resin A to the resin B (the former/the latter, by weight) is 1/99 to 99/1; and the proportion of the black dye or pigment C is 0.01 to 3 parts by weight relative to 100 parts by weight of the total amount of the resin A and the resin B.

3. A resin composition for white marking comprising an acrylic resin A, a rubber-modified styrenic resin B1, a black dye or pigment C and a white dye or pigment D and being capable of developing a white marking by irradiation of laser beams, wherein the amounts of the black dye or pigment C and the white dye or pigment D are 0.05 to 1 parts by weight and 0.1 to 1 parts by weight, respectively, relative to 100 parts by weight of the total amount of the resin A and the resin B1.

4. A resin composition for a white marking as claimed in claim 3, wherein the acrylic resin A is a polymer A1 containing methyl methacrylate as a constitutive monomer; the proportion of the resin A1 to the resin B1 (the former/the latter, by weight) is 10/90 to 90/10; and the total amount of the black dye or pigment C and the white dye or pigment D is 0.3 to 1.2 parts by weight relative to 100 parts by weight of the total amount of the resin A and the resin B1.

5. A resin composition for a white marking which comprises an acrylic resin A, a styrenic resin B and a black dye or pigment C, and which is capable of developing a white marking by irradiation of laser beams, wherein the difference between the number average molecular weight of the resin A {Mn(A)} and that of the resin B {Mn(B)}, ΔMn{= |Mn(A)−Mn(B)|}, is not higher than 80,000.

6. A resin composition for a white marking which comprises an acrylic resin A, a styrenic resin B, a black dye or pigment C and a white dye or pigment D, and which is capable of developing a white marking by irradiation of laser beams, wherein the total amount of the black dye or pigment C and the white dye or pigment D is 0.2 to 1.5 parts by weight relative to 100 parts by weight of the total amount of the resin A and the resin B.

7. A resin composition for a white marking as claimed in claim 5, wherein the portion of the resin A to the resin B (the former/the latter, by weight) is 1/99 to 99/1; and the proportion of the black dye or pigment C is 0.01 to 3 parts by weight relative to 100 parts by weight of the total amount of the resin A and the resin B.

8. A resin composition for a white marking as claimed in claim 6, wherein an acrylic monomer amounts to, as a whole, 20 to 80% by weight of the monomers comprising the resin A and the resin B.

9. A resin composition for a white marking as claimed in claim 6, wherein the proportion of said white dye or pigment D is 0.1 to 1 parts by weight relative to 100 parts by weight of the total amount of the resin A and the resin B.

10. A resin composition for a white marking as claimed in claim 6, wherein said resin A is poly(methyl methacrylate).

11. A resin composition for a white marking as claimed in claim 6, wherein a number average molecular weight of said resin A is 50,000 to 150,000.

12. A resin composition for a white marking as claimed in claim 6, wherein said resin B is a rubber-modified styrenic resin.

13. A resin composition for a white marking as claimed in claim 6, wherein said resin B is an acrylonitrile-butadiene-styrene copolymer, or a mixture of an acrylonitrile-butadiene-styrene copolymer and an acrylonitrile-styrene copolymer.

14. A resin composition for a white marking as claimed in claim 13, wherein the proportion of an acrylonitrile monomer unit relative to a styrene nomomer unit (the former/the latter, by weight) is 15/85 to 28/72 in the whole of said resin B.

15. A resin composition for a white marking as claimed in claim 6, wherein a number average molecular weight of a polymer constituting the resin B or a matrix component is 30,000 to 100,000, being determined for (a) the polymer, provided that the polymer is a homogeneous resin, or (b) the matrix component, provided that the polymer constituting the resin B is a heterogeneous resin composed of a continuous phase of the matrix component and a disperse phase.

16. A resin composition for a white marking as claimed in claim 6, wherein said black dye or pigment C is a carbon black.

17. A resin composition for a white marking as claimed in claim 6, wherein said white dye or pigment D is titanium oxide.

* * * * *